Sept. 12, 1961 A. E. JOHNSON 2,999,950
DIRECT CURRENT POWER SOURCE
Filed Aug. 27, 1958 2 Sheets-Sheet 1

INVENTOR.
ARTHUR E. JOHNSON
BY
*Andrus & Starke*
Attorneys

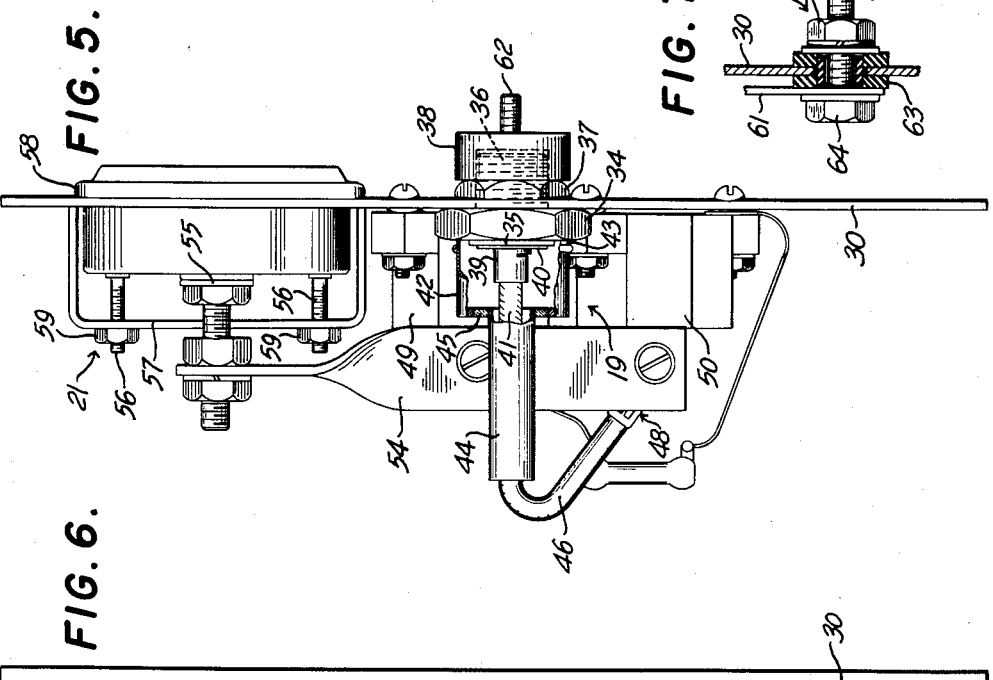
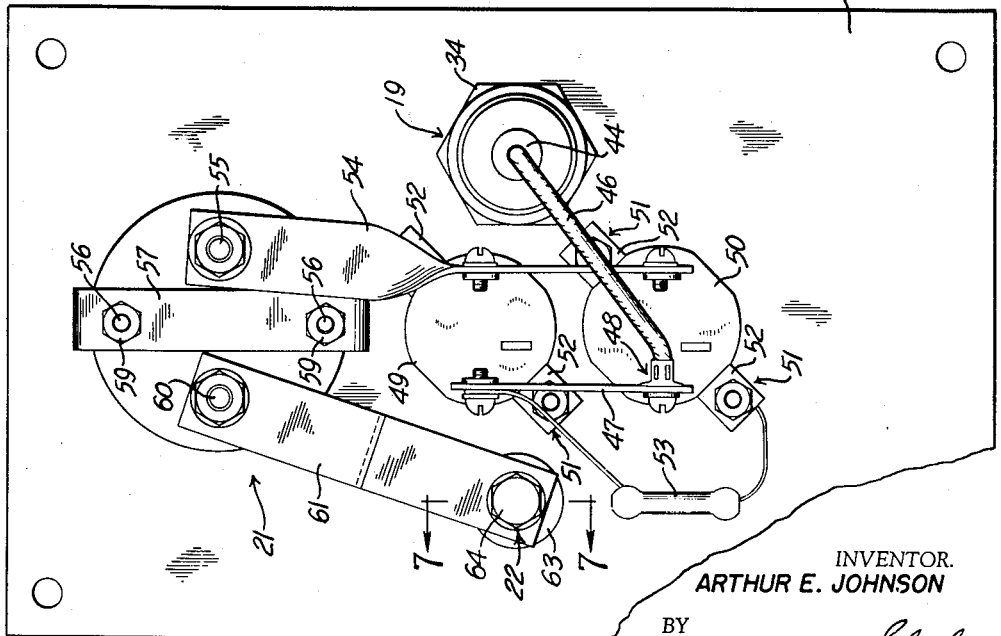

United States Patent Office 2,999,950
Patented Sept. 12, 1961

2,999,950
DIRECT CURRENT POWER SOURCE
Arthur E. Johnson, Elkhorn, Wis., assignor to A. O. Smith Corporation, Milwaukee, Wis., a corporation of New York
Filed Aug. 27, 1958, Ser. No. 757,574
7 Claims. (Cl. 307—155)

This invention relates to a direct current power source and particularly to a separate rectifier assembly adapted to be readily attached to a welding transformer and to employ the transformer in combination with the rectifier as a direct current power source for charging a battery.

The owner of a small farm or automotive repair garage periodically faces problems involving welding or battery charging. Conventionally completely separate units for each of these operations are maintained.

A simple and reliable combined alternating current and direct current machine to selectively provide an alternating current welding output or a direct current battery-charging output is disclosed and claimed in the United States Patent 2,836,736 which issued May 27, 1958, to A. E. Johnson. As disclosed therein, a half-wave rectifier is adapted to be selectively connected in series with the secondary of the welding transformer.

Although the welding transformer has a substantially high open-circuit voltage, the full open-circuit voltage is never applied to the rectifier assembly except through the battery because of the use of a half-wave rectifier and the machine can therefore be economically produced.

This invention is particularly directed to such a combined welding transformer and battery-charging circuit and is more particularly directed to a separate rectifying kit which is adapted to be readily mounted upon the housing of the welding unit and which is connected electrically in circuit with the welding source through the physical attachment to establish a direct current source suitable for charging a battery.

In accordance with the present invention, the welding transformer has its secondary winding and at least a portion of the transformer housing connected in common to electrical ground, in accordance with conventional practice. This grounded portion of the housing is adapted to have a rectifier mounting plate securely attached thereto. The mounting plate carries a rectifier having one terminal electrically connected to the plate and the other terminal provided with an insulated connecting means. The latter is also mounted on the plate and serves as the negative terminal in the battery charging connection. When the mounting plate is attached to the housing, the mounting plate and the rectifier terminal electrically connected thereto are automatically grounded. By connecting the positive side of the battery to be charged to a positive welding output terminal and by connecting the negative terminal of the battery to be charged to the negative output terminal on the welding plate, a charging circuit is established and the battery is charged.

The present invention thus provides a separate rectifying kit or assembly which may be readily attached to an appropriate welding transformer and electrically connected in circuit without the necessity of making any internal connections.

The drawing furnished herewith illustrates the best mode presently contemplated for carrying out the invention.

In the drawings:
FIG. 1 is a schematic circuit diagram showing the combined battery-charging circuit and the welding circuit connected for welding;

FIG. 5 is an enlarged side elevational view of the rectifier plate assembly;

FIG. 6 is an enlarged rear elevational view of the battery-charging plate assembly; and FIG. 7 is a fragmentary sectional view of the plate assembly illustrating an output terminal construction.

Figure 1:
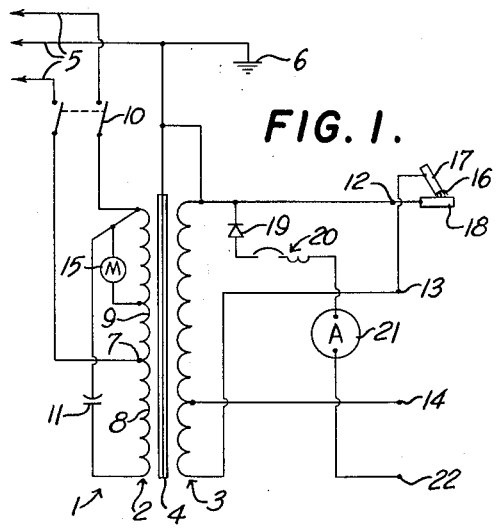

Referring to the drawing, and particularly to FIG. 1 thereof, a welding transformer 1 is schematically illustrated as comprising a primary winding 2 and a secondary output winding 3 magnetically coupled together by a suitable magnetic core 4. The primary winding 2 is adapted to be connected to a set of three-wire, single-phase power lines 5 having the central line grounded as at 6 with the voltage between ground and each of the other wires being equal to one-half of the voltage across the two other lines. The primary winding 2 is provided with a center tap 7 to divide the primary winding into corresponding lower and upper portions 8 and 9 which are selectively connected in parallel across the full voltage of the incoming power lines 5 by a double-pole switch 10. A power factor correcting capacitor 11 is connected in series with the lower portion 8 of the primary winding 2. The secondary winding 3 which is magnetically coupled to the primary 2 is provided with a suitable number of turns to establish an output voltage and current adapted for alternating current welding.

Three output terminals 12, 13, and 14 are provided on the secondary winding 3. The first output terminal 12 is connected to the grounded power line 6 along with the core 4 and establishes a common ground connection.

The output terminal 13 is secured to the opposite end of the secondary winding 3 and thus in maximum electrically spaced relation to terminal 12 and provides a maximum output voltage.

The output terminal 14 is connected intermediately to the outer ends of the winding 3 and is adapted to establish a smaller, less forceful voltage output.

The secondary winding 3 is magnetically loosely coupled to the primary winding 2 such that a conventional drooping output voltage characteristic is obtained. That is, as the current increases, the voltage decreases. Any other suitable means, such as a separate reactance control, can also be employed to establish the drooping voltage characteristic.

A small fan-motor 15 is connected across a part of the primary winding portion 9 to continuously force air over the transformer windings and the core and thereby carry away the heat generated by the current flow in the windings, particularly the relatively heavy welding current flow through the secondary winding 3.

In the welding operation, an arc 16 is established between an electrode 17 which is connected to either of the positive output terminals 13 or 14, depending upon the type of arc desired, and a workpiece 18 which is connected to the common ground 6. Thus, connection of electrode 17 to the output terminal 13 connects full output voltage across the arc 16 and establishes a forceful and penetrating arc. Connection of electrode 17 to output terminal 14 connects only a portion of the total output voltage across the arc 16 and establishes a smoother and less forceful arc 16.

Figure 2:
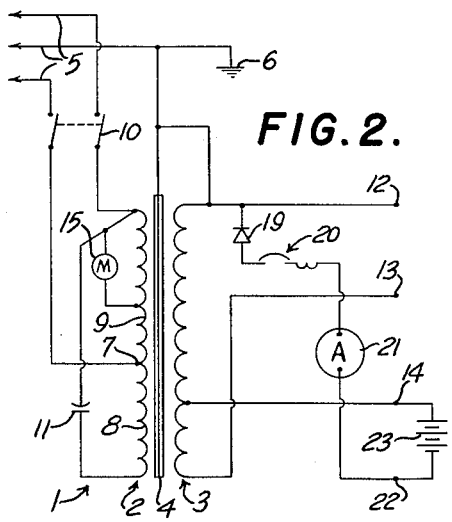
FIG. 2 is a view similar to FIG. 1 with the apparatus connected for charging a battery.

Referring particularly to FIG. 2, the same transformer 1 is employed in a battery charging circuit, with corresponding components shown in FIGS. 1 and 2 having the same number.

A half-wave rectifier 19 is connected in a series circuit with an overload switch 20 and an ammeter 21. One end of the series circuit is connected to ground lead 6 in common with the common ground terminal 12 and the opposite end is connected to an output terminal 22. The rectifier 19 is shown polarized to permit current flow through the series circuit from the terminal 22 to ground and to block a reverse current although opposite polarization may also be employed.

A battery 23, which is to be charged, has its positive terminal connected to the intermediate terminal tap 14 of the welding transformer 1 and its negative terminal connected to the battery-charging terminal 22. The output voltage of the transformer 1 is not applied to the rectifier 19 without the series connection of the battery 23 as a load, in a manner corresponding to that disclosed in the previously referred to copending application. A relatively inexpensive rectifier 19 can therefore be employed.

With a battery 23 connected in circuit, a half-cycle of the current is present while terminal 14 is positive and flows from terminal 14 through the battery 23 and the negative output terminal 22 and then through the series circuit including rectifier 19 to ground and back to the opposite or grounded side of the secondary winding 3. During the opposite half-cycle of current, the rectifier 19 blocks current flow through the circuit.

The ammeter 21 indicates the charging current and by suitable external electrical controls or by suitable adjustment of the coupling of secondary winding 3 to the primary winding 2, the desired or necessary charging current is established.

The overload switch 20 protects the power source in the event of a short circuit through the battery or the like.

Figures 3, 4:
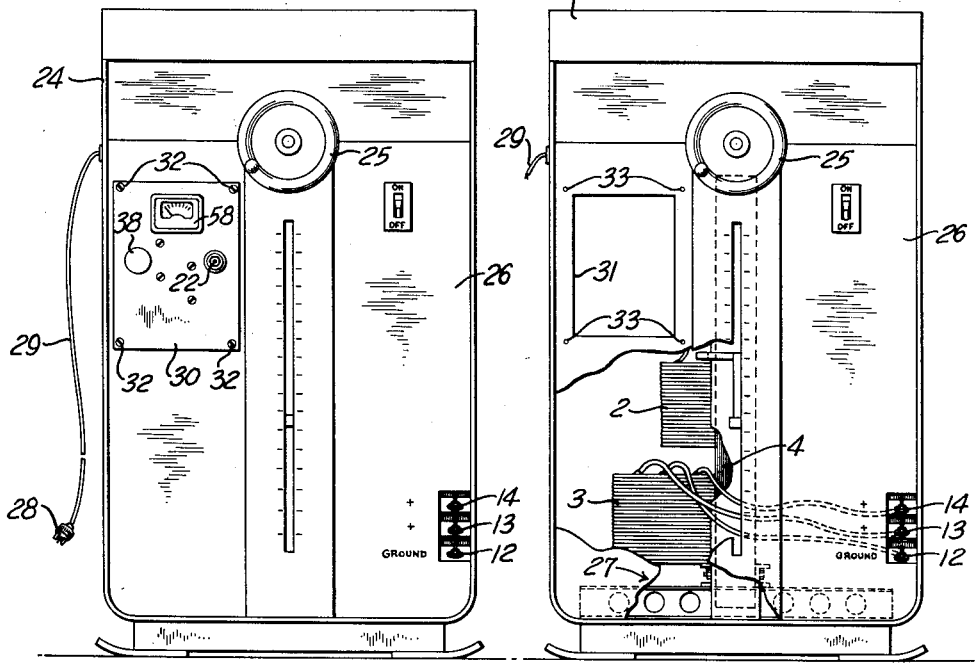
FIG. 3 is a front elevational view of a welding transformer having a battery charging kit or plate assembly secured thereto.
FIG. 4 is a view similar to FIG. 3 with the rectifier plate assembly removed and with parts broken away to show certain internal components of the transformer, diagrammatically.

Referring particularly to FIGS. 3 and 4 in accordance with one embodiment of the present invention, the transformer 1 is housed within a metallic housing 24. The transformer core 4 is of a generally three-legged rectangular configuration having the secondary winding 3 and the primary winding 2 wound on the control leg. A suitable crank mechanism, not shown, is operably associated with the primary winding 2 and includes a manually operable crank 25 on the front panel 26 of the housing 24 by which the coupling of the primary winding 2 to secondary winding 3 is adjusted. Four threaded connecting studs or terminals, numbered in FIGS. 3–6 in accordance with the corresponding output terminals 12, 13, 14 and 22 of FIGS. 1 and 2, are suitably mounted on the front panel 26 of the housing 24 to provide ready access to the terminals.

The magnetic core 4 of transformer 1 is rigidly mounted within the housing 24 by suitable housing brackets 27 which also serve to connect the core electrically directly to the grounded housing 24.

A three-prong power plug 28 is secured to the outer end of a power cable 29 which is connected to the primary winding 2 and ground terminal 12 and which extends outwardly of the housing 24. The plug 28 is adapted to be inserted in a corresponding three-pronged power receptacle, not shown, to connect incoming power lines 5, not shown in FIGS. 3–6, to the primary winding 2 and the ground terminal 12 in accordance with the schematic illustration in FIGS. 1 and 2.

The rectifier 19, switch 20 and ammeter 21 of the rectifying circuit are mounted on a rectangular plate 30 of aluminum or other suitable metal, as shown in detail in FIGS. 3 and 5–7. The plate 30 is secured over an opening 31 in the front panel 26 of the housing 24 as by a plurality of small bolts 32, shown one at each corner of plate 30 in FIG. 3. The bolts 32 extend through correspondingly spaced openings in the plate 30 and thread into tapped openings 33 in the housing 24.

The overlapping marginal portion of the housing 24 and the plate 30 are each cleaned of any foreign matter such that a positive and firm electrical connection is established therebetween when the bolts 32 are tightly drawn up.

Referring particularly to FIGS. 5 and 6, the rectifier 19 is illustrated as a small, silicon rectifier assembly similar in construction to the germanium rectifier shown and described in applicant's previously referred to copending application. The illustrated rectifier assembly 19 generally includes a heavy disc-like copper base 34 carrying a small rectifying wafer 35, shown substantially enlarged. The rectifying element is preferably a standard silicon element having a relatively low cost and long life. The rectifying wafer 35 is soft-soldered or otherwise secured in an intimate electrical connection to one surface of the mounting base 34 which serves as a heat sink for the heat generated by current flow through the wafer. A threaded stud 36 extends integrally from the opposite side of the mounting base 34 through an opening in the metal plate 31. A hex nut 37 threads onto the stud 36 and draws the base 34 into intimate contact with the inner surface of the aluminum plate 30. Consequently, the inner surface of the rectifying wafer 35 is in firm and positive electrical connection with the plate 31. An insulator cap 38 is disposed over the outer end of stud 36 to insulate and protect the stud from damage and foreign matter.

A connector 39 is provided with a current-collecting, disc-like portion 40 which is soft-soldered or otherwise suitably secured in electrical connection to the opposite surface of the wafer 35. A small jumper lead 41 is clamped within the connector 39 and constitutes the opposite terminal of the rectifying unit.

An inverted cup-shaped housing 42 is disposed over connector 39 and the wafer 35 and is hermetically secured at its lower end to an integrally formed tubular extension 43 of the mounting base 34. The enclosing housing 42 prevents oxidation and contamination of the rectifying wafer 35 and also assists in dissipating the heat generated by current flow through the rectifying wafer 35. The jumper lead 41 from connector 39 is secured at its opposite end to a tubular connector 44 which is secured within an opening in the housing 42 by a suitable insulating material 45 such as glass. A terminal connecting lead or cable 46 is crimped within the opposite end of the tubular connector 44 and is connected at its opposite end to a common busbar 47 through a standard pressure connector 48, as shown in FIG. 6.

The wafer 35 is polarized to permit conduction from the connector 44 to plate 30 and to block a reverse current flow, in accordance with the schematic circuit shown in FIG. 2.

Referring particularly to FIG. 6, the common busbar 47 connects corresponding terminals of a pair of circuit breakers 49 and 50 corresponding to the overload switch 20, shown in FIG. 1. The circuit breakers 49 and 50 are each suitably mounted in side-by-side relation on the back side of the plate 30 by suitable bolt and nut assemblies 51 which cooperate with apertured laterally extending tabs 52. A resistor 53 connects the busbar 47 directly to the plate 30 to prevent establishment of high potential differences in the event of breakdown.

The opposite corresponding terminals of the circuit breakers 49 and 50 are connected in common by a busbar 54 to one terminal 55 of the current meter 21 which is mounted within an opening in plate 31.

The meter 21 includes a pair of rearwardly extending studs 56 which pass through suitable openings or apertures in a U-shaped bracket 57 on the back side of plate 30. A flange 58 is integrally formed on the front portion of meter 21 and engages the front surface of the plate 30 adjacent the meter opening. Suitable hex nuts 59 are threaded onto the studs 56 to rigidly clamp the meter 21 upon the base plate 30.

The opposite terminal 60 of the meter 21 is connected by a busbar 61 to an output terminal 22 which is mounted in electrically insulated relation upon plate 30.

Referring particularly to FIG. 7, the illustrated construction of terminal 22 comprises a threaded bolt 62 extending through an aperture in the plate 31. An insulating grommet 63 is secured within the opening and insulates the bolt 62 from the plate 30. The busbar 61 from meter terminal 60 is suitably apertured and disposed over bolt 62 between the head 64 of the bolt 62 and the grommet 63 to electrically connect the bolt 62 to the meter terminal 60. The terminal bolt 62 is rigidly secured in place by a hex nut 65 which threads onto the front extending portion of bolt 62. Consequently, the negative output terminal 22 is insulated from the grounded plate 30 and from the metallic transformer housing 24 to maintain the output terminal 22 of the rectifier 19 at a negative potential with respect to ground when connected in a battery charging circuit.

The other connecting terminals 12, 13 and 14 may be similarly constructed. The ground terminal 12 does not have to be insulated from the housing 24 which is maintained at ground potential.

The terminal 22 on mounting plate 30 is connected to the negative terminal of the battery 23 and the intermediate terminal 14 on the front panel 26 is connected to the positive terminal of battery 23 to establish the charging circuit of FIG. 2. The rectifying wafer 35 is assumed polarized to allow current flow from negative terminal 22 to ground and to block a reverse current flow, in accordance with the illustration of FIG. 2. When the power connection to power lines 5 is completed through the power plug 28, current flows through the battery 23 to charge the same.

Consequently, by simply mounting the plate 30 onto the metallic housing 24, a welding unit is transformed into a battery charging unit having a circuit schematically illustrated in FIG. 2.

A welding machine or a low-cost combination welding and battery charging machine can therefore be offered for sale without maintaining a large inventory of separate power units.

The simple battery charging kit may be sold separately to be placed on existing welding power sources in the field because of the simple method of attachment and connection circuit.

The apparatus of this invention is thus seen to provide a very simple, inexpensive and reliable assembly for creating a combined welding and battery charging unit.

Various modes of carrying out the invention are contemplated as being within the scope of the following claims particularly pointing out and distinctly claiming the subject matter which is regarded as the invention.

I claim:

1. A battery charging kit adapted to be attached to a metal portion of a housing of a transformer unit having the metal portion and one side of the transformer adapted to be connected in common, which comprises a metal plate adapted to be attached to the housing in electrical connection with the metal portion of the housing, a rectifier mounted on said metal plate and having a first pole electrically connected to said plate, and an output terminal insulated from said metal portion and electrically connected to a second pole of said rectifier.

2. A battery charging kit adapted to be attached to the metal housing of a welding power source having one side thereof grounded to the housing, which comprises a metallic plate adapted to be attached in direct contact with the housing, a half-wave rectifier mounted on said metal plate with a first pole in electrical connection with said plate, and an output terminal mounted in insulated relation on said plate and electrically connected to a second pole of said rectifier and adapted to be connected to the negative terminal of a battery to be charged.

3. A battery charging kit adapted to be attached to the metal housing of a transformer welding power source having one side of the welding output grounded to the metal housing, which comprises a metal plate adapted to be attached to the housing, a disc-shaped metallic base, a solid state rectifier element mounted on one face of the base with a first pole of the element in electrical contact with said base, means to secure the base to the metal plate with the opposite face of the base in intimate contact with the plate, and an output terminal mounted in insulated relation on said plate and electrically connected to a second pole of said rectifier element and adapted to be connected to the negative terminal of a battery to be charged.

4. A battery charging kit adapted to be attached to the metal housing of a transformer welding power source having one output side thereof grounded to the metal housing, which comprises a metal plate adapted to be attached to the housing, a disc-shaped metallic base having a threaded stud extending axially from a central portion of one face thereof, a small solid state rectifying element secured in intimate electrical contact with the opposite face of the base, said metal plate having an opening through which said threaded stud is passed, a lock nut threaded onto said stud to hold said base on said metal plate with the adjoining faces in intimate electrical contact, and an output terminal attached to said metal plate and electrically insulated therefrom, said output terminal being electrically connected to the opposite face of said rectifying element.

5. A battery charging kit adapted to be attached to the metal housing of a transformer welding power source having one side of the welding output grounded to the metal housing, which comprises a metal plate adapted to be attached to the housing, a disc-shaped metallic base, a solid state rectifier element mounted on one face of the base with a first pole of the element in electrical contact with said base, means to secure the base to the metal plate with the opposite face of the base in intimate contact with the plate, an overload device mounted on said metal plate, a current meter mounted on said metal plate and arranged to be visually observable with said plate mounted on said metal housing, an output terminal mounted in insulated relation on said plate, and electrical connecting means serially connecting said overload device and said current meter between said output terminal and a second pole of the rectifier element.

6. In a battery-charging and arc welding power source, a metal housing for said power source, a welding transformer mounted within the housing and having a secondary output winding adapted to provide a welding current suitable for arc welding, an output terminal connected to ground and to one side of the secondary output winding and to said housing, a second output terminal mounted on said housing and connected to said secondary winding in electrically spaced relation to said grounded terminal, a metal member removably mounted upon said housing and in electrical connection therewith, a rectifier mounted on said metal member and having a first electrical pole connected to said plate, and a third output terminal mounted in insulated relation on said metal member and connected to a second pole of the rectifier, said construction permitting connection and disconnection of said battery circuit without necessity of internal electrical connection to the transformer.

7. In a battery charging and arc welding power source adapted to be connected to a single-phase 3-wire power line having one ground wire, a metal housing for said power source, a welding transformer mounted within the housing and having a primary winding adapted to be connected across the full voltage of said 3-wire single-phase power lines and having a secondary output winding adapted to supply a welding current suitable for arc welding, an output terminal mounted on said housing and electrically connected to one end of the secondary output winding and to the housing and to said ground wire, a second output terminal mounted in insulated relation on said housing and connected to said secondary winding in electrically spaced relation to said first output terminal, a metal plate removably attached in direct contact to said housing, a rectifying element mounted on said metal plate and having a negative pole connected to said plate, and a third output terminal mounted in insulated relation on said plate and connected to a positive pole of the rectifying element whereby said first output terminal and said third output terminals provide an output suitable for charging a battery, said construction permitting provision of said battery charging circuit without necessity of internal electrical connection to the transformer.

References Cited in the file of this patent

UNITED STATES PATENTS 2,836,736     Johnson  ---------------- May 27, 1958